US012707272B2

(12) United States Patent
Venkata Rao

(10) Patent No.: US 12,707,272 B2
(45) Date of Patent: Aug. 11, 2026

(54) LOCATION-AWARE SECURITY VALIDATION FOR NETWORK DEVICE SETUP

(71) Applicant: T-Mobile USA, Inc., Bellevue, WA (US)

(72) Inventor: Savitha Venkata Rao, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 68 days.

(21) Appl. No.: 18/969,217

(22) Filed: Dec. 4, 2024

(65) Prior Publication Data

US 2026/0156477 A1 Jun. 4, 2026

(51) Int. Cl.
*H04W 12/63* (2021.01)
*H04W 12/08* (2021.01)
*H04W 60/00* (2009.01)

(52) U.S. Cl.
CPC ........... *H04W 12/63* (2021.01); *H04W 12/08* (2013.01); *H04W 60/00* (2013.01)

(58) Field of Classification Search
CPC ...... H04W 12/63; H04W 12/08; H04W 60/00
See application file for complete search history.

(56) References Cited

U.S. PATENT DOCUMENTS 8,050,655 B2 11/2011 Champion et al.
8,244,223 B2 8/2012 Farah
8,280,347 B2 10/2012 Azimi et al.
8,295,812 B1 10/2012 Jones
8,463,258 B2 6/2013 Parsons et al.
10,477,390 B1 11/2019 Verma et al.
10,708,766 B1 7/2020 Umamaheswaran et al.
10,812,532 B2 10/2020 Verma et al.
11,729,587 B1 8/2023 Engelhart
2004/0192303 A1 9/2004 Puthenkulam
2005/0280557 A1 12/2005 Jha et al.
2009/0217348 A1* 8/2009 Salmela .................. H04L 67/12 726/2
2009/0253406 A1* 10/2009 Fitzgerald ........... H04W 12/082 455/410
2010/0009659 A1 1/2010 Netanel et al.
2010/0219979 A1 9/2010 Oerdoegh
2011/0153441 A1 6/2011 Smith et al.
(Continued)

FOREIGN PATENT DOCUMENTS

CN 112492594 A 3/2021
WO 2012037161 A2 3/2012
WO 2012037167 A1 3/2012

*Primary Examiner* — Darren B Schwartz
(74) *Attorney, Agent, or Firm* — Perkins Coie LLP

(57) ABSTRACT

The solution enhances the security of new wireless device setups is enhanced by the verification of the geographic location of the new device upon network attachment against the one or more known subscriber locations, or locations associated with the network subscriber that is expected or intended to be operating the new device. These locations can include a home address recorded in subscriber profile information stored by the telecommunications network, for example. If a mismatch is detected, a security alert is sent to the network subscriber's current wireless device, enabling confirmation whether it is the network subscriber that is attempting to use and set up the new device.

20 Claims, 4 Drawing Sheets

(56) References Cited

U.S. PATENT DOCUMENTS

| | | | | |
|---|---|---|---|---|
| 2012/0036559 | A1* | 2/2012 | Zabawskyj | H04W 12/08<br>726/4 |
| 2012/0303538 | A1* | 11/2012 | Marcus | G06Q 30/06<br>705/330 |
| 2021/0185523 | A1* | 6/2021 | Targali | H04W 12/0471 |
| 2021/0218751 | A1* | 7/2021 | Rodriguez Bravo | G06F 21/34 |
| 2023/0089726 | A1* | 3/2023 | Subramanian | G06Q 10/083<br>705/330 |
| 2024/0056485 | A1* | 2/2024 | Xu | H04L 63/20 |
| 2025/0254176 | A1* | 8/2025 | Grobelny | H04L 63/0876 |

* cited by examiner

LOCATION-AWARE SECURITY VALIDATION FOR NETWORK DEVICE SETUP

BACKGROUND

The process of setting up wireless devices for operation on a telecommunications network has been evolving to reduce reliance on experts/technicians and enable device users to complete the setup process on their own. For example, processes have been developed to enable a device user to transfer certain data (e.g., contact information, photos, user application data) from an old wireless device to a new wireless device that is being setup and activated for the telecommunications network.

With advancements in automated or user-enabled setup of wireless network devices, however, security of network device setup has become an increasing concern and challenge. That is, given the absence or reduced presence of trusted experts or network operators in setting up a wireless device, there exists increased opportunities for malicious actors to infiltrate the device setup process. A need exists to maintain or improve security around a wireless device setup with a telecommunications network.

BRIEF DESCRIPTION OF THE DRAWINGS

Detailed descriptions of implementations of the present invention will be described and explained through the use of the accompanying drawings.

Figure 1:
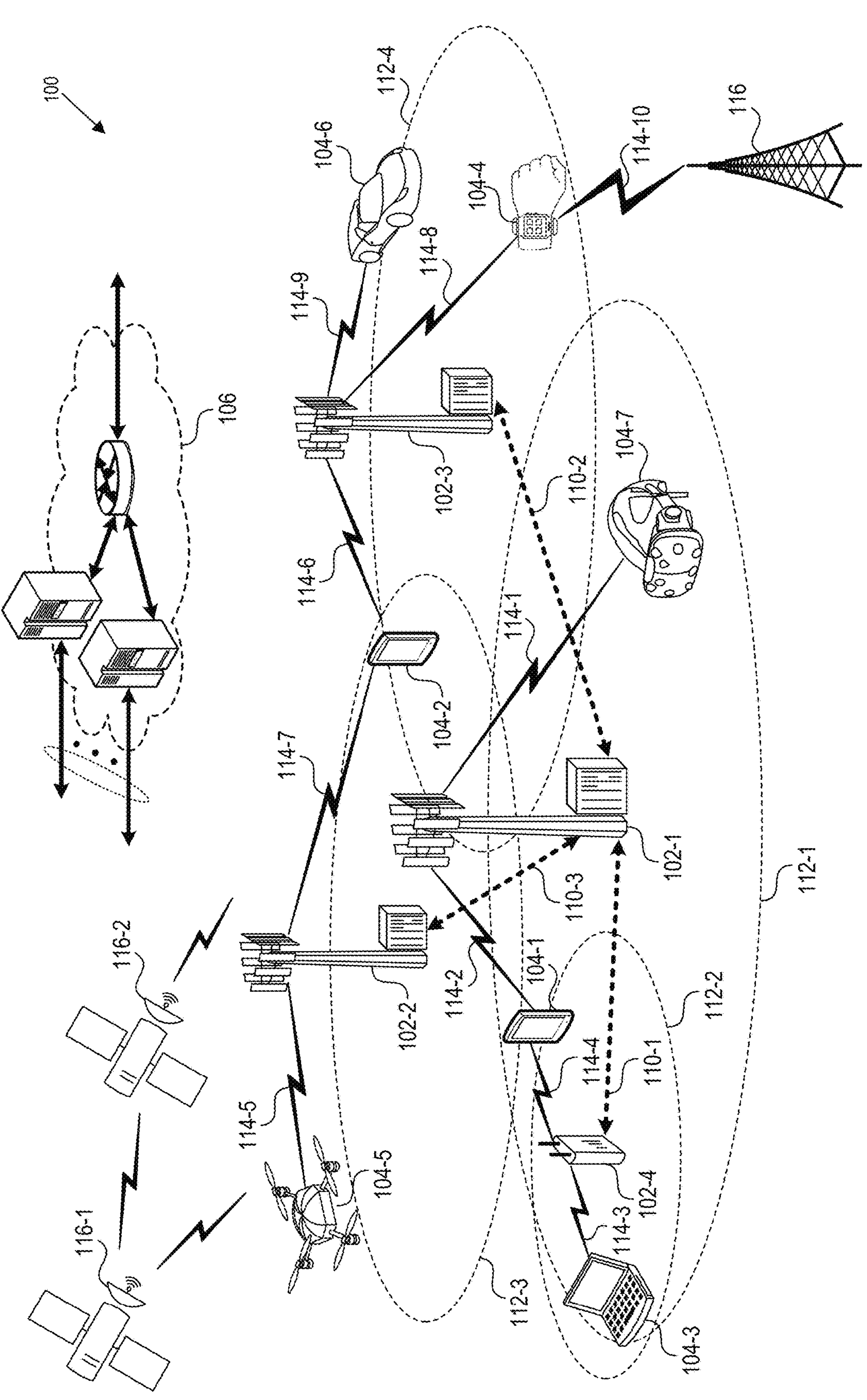
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present disclosure introduces solutions for enhancing security with the setup of new wireless devices for a telecommunications network. In particular, disclosed solutions involve a network-driven location estimation for a new wireless device being setup and a comparison of the estimated location with known locations associated with a network subscriber expected to possess and operate the new wireless device.

With the solutions described herein, technical challenges related to device shipment and delivery to network subscribers, among others, can be addressed. Currently, wireless devices or user equipment (UE) may be set up at home by network subscribers without experts, retail workers, technicians, and/or the like present. For instance, features such as eSIMs (e.g., digital or virtual subscriber identity modules) and local data transfer (e.g., between an old device and a new device) enable a user to easily and seamlessly setup a new device at home for operation on a telecommunications network. As such, many network subscribers opt for their new wireless devices to be shipped or delivered to them, with the need for a technician or worker at a retail store to perform the new device setup being precluded or minimized. However, shipment of new wireless devices to network subscribers exposes security risks for theft, fraud, and the like. During a transit period, a network subscriber may be unsure whether their new wireless device is still on its way or whether their new wireless device has already been stolen.

Using network-based location estimates and network-managed subscriber information, the solutions described herein enable earlier detection of whether a new wireless device has been intercepted or has been delivered to the intended recipient. Once a new wireless device has attached to and been identified by (e.g., via its International Mobile Equipment Identifier (IMEI)) a telecommunications network, the telecommunications network is able to estimate the location of the new wireless device. A mobile network operator (MNO) of the telecommunications network also stores subscriber information for the intended recipient of the new wireless device, such as a home address, billing address, recent/frequent cell site locations, and/or the like. Thus, the network-based location estimate for the new wireless device can be compared with known subscriber locations. In the case of a location discrepancy, a security alert can be provided at current wireless devices being used by the network subscriber (e.g., an old smartphone intended to be replaced by the new device), enabling the network subscriber to confirm whether or not they have obtained possession of the new wireless device (despite the location discrepancy). Various security actions can be executed based on the network subscriber's response to the security alert.

Thus, the present disclosure addresses technical challenges related to malicious actions or mistakes related to the delivery of new wireless devices to network subscribers. MNO systems and/or systems coupled to or included within the telecommunications network may be uniquely suited to address at least these technical challenges, due to the capability of network to estimate device attachment locations and store known subscriber locations. Furthermore, because network attachment is one of the first operations performed by a new device when booting or powering on, integrating the disclosed solutions with the telecommunications network can enable earlier detection of device misplacement or theft.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Embodiments of Wireless Communications Systems

FIG. 1 is a block diagram that illustrates a wireless telecommunication network 100 ("network 100") in which aspects of the disclosed technology are incorporated. For example, the network 100 is configured to assess hardware device identifiers (e.g., IMEIs) of connected devices and/or estimate locations of connected devices, and the network 100 may store subscriber profile information. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity (e.g., for RCS messaging), and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Example Embodiments of 5G Core Network Functions

Figure 2:
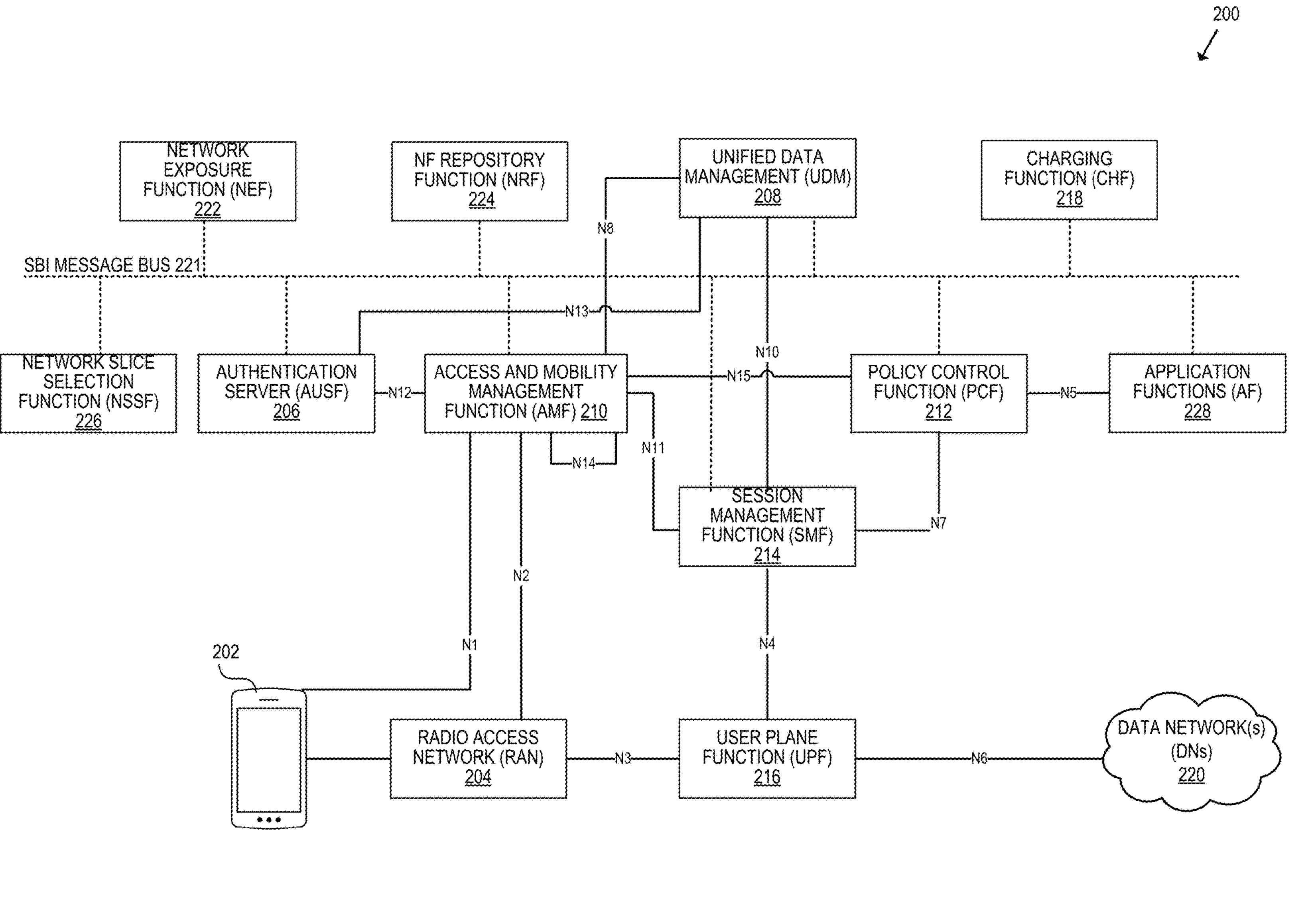
FIG. 2 is a block diagram that illustrates core network functions (NFs) that can implement aspects of the present technology.

FIG. 2 is a block diagram that illustrates an architecture 200 including 5G core network functions (NFs) that can implement aspects of the present technology. For example, the core network functions may be configured to compute location estimation techniques or processes (e.g., location triangulation), store recently determined locations for certain wireless devices, store subscriber profile information including recent/frequent/home locations, and/or the like.

A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Example Techniques for Enhancing Security with Wireless Device Network Setup

Security of the setup (and delivery) of new wireless devices on a telecommunications network is improved based on comparing device attach locations to expected subscriber locations. Subscriber history and activity on the telecommunications network, including prior locations and currently connected wireless devices, can further be leveraged to handle at least false positive determinations of device theft or interception.

Figure 3:
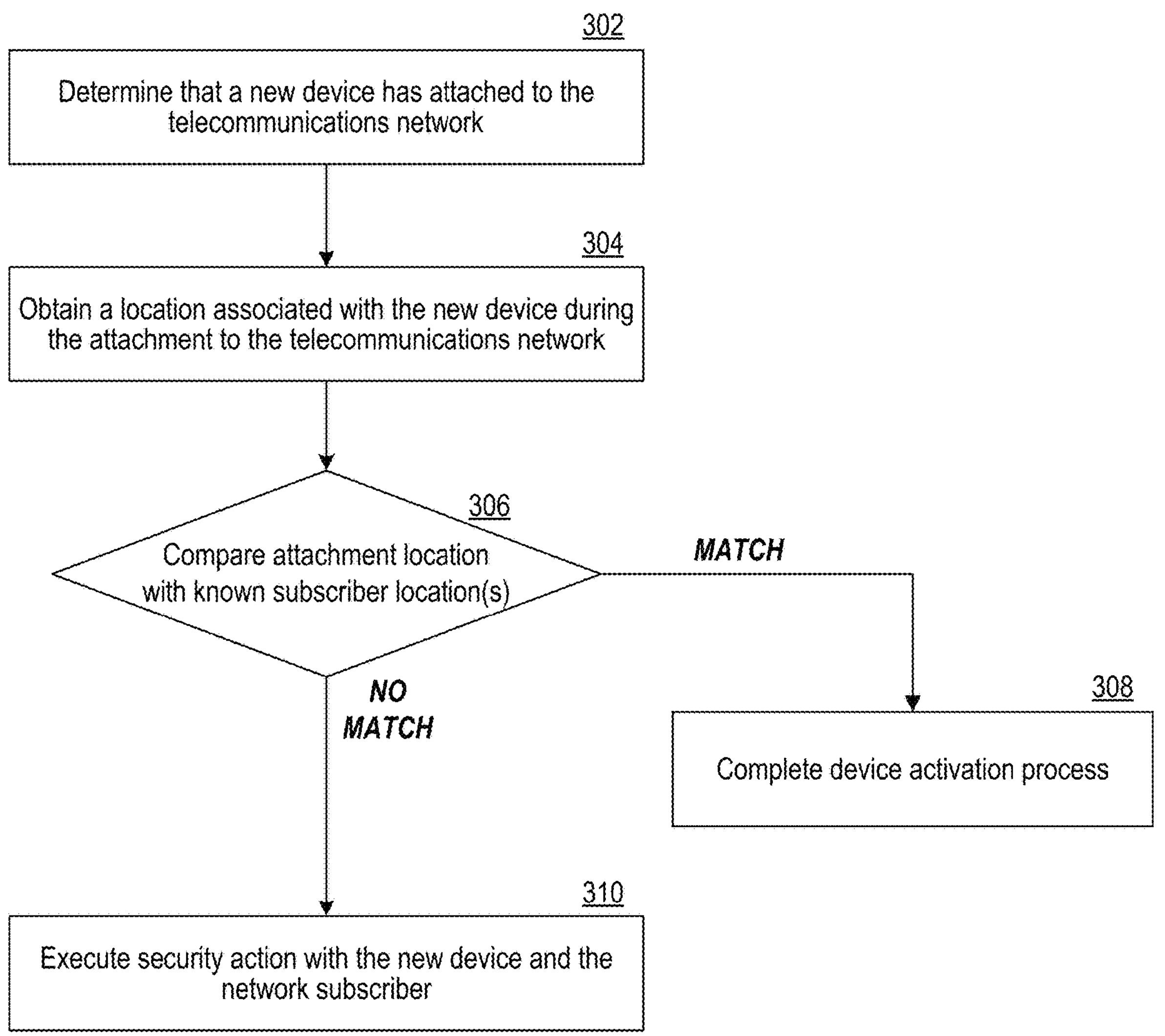
FIG. 3 is a flow diagram of an example method for location-aware security validation of a wireless device network setup, in accordance with aspects of the present technology.

FIG. 3 is a flow diagram of an example method for location-aware security validation of a wireless device network setup. In some implementations, at least some of the operations described with FIG. 3 may be performed by a computing system associated with a mobile network operator (MNO) of a telecommunications network. In some implementations, at least some of the operations described with FIG. 3 may be performed by one or more core network functions of the telecommunications network to which the new device has attached.

At 302, the system determines that a new wireless device has attached to the telecommunications network. The network is configured to receive initial information for each device attaching to the network according to an initial attachment procedure or process, and the initial information includes at least a hardware device identifier (e.g., an IMEI). The initial information that the network receives upon a device attaching can further include an International Mobile Subscriber Identity (IMSI), an Integrated Circuit Card Identification (ICCID), a media access control (MAC) address, an Electronic Serial Number (ESN), a Mobile Equipment Identifier (MEID), an identifier associated with an eSIM or an Embedded Universal Integrated Circuit Card (eUICC), and/or the like. In some implementations, a subscriber identity is provided by the wireless device during the initial attachment procedure. In some examples, the subscriber identity is associated with the intended recipient of the wireless device. In some examples, the wireless device is configured with a bootstrap eSIM profile, a default profile, a blank profile, and/or the like, which allows the wireless device to attach to the network. In some examples, the wireless device has been intercepted or misdelivered, and the subscriber identity is associated with a network subscriber different than the intended recipient of the wireless device.

Based at least on the hardware device identifier, the system can determine that the wireless device is a new device. In some implementations, the network stores a database that includes identifiers associated with known devices. The database can also include identifiers associated with blacklisted devices or devices that are otherwise unique or special (e.g., emergency personnel devices), thus enabling the network to handle different access scenarios for different devices. The hardware device identifier not being found in the device identifier database can therefore indicate, to the system, that the wireless device is new.

In some implementations, the system (and/or the telecommunications network itself) can generate and store shipment records of new wireless devices that have been shipped and are being delivered to network subscribers. These records can particularly identify new devices that have recently been shipped and are still in transit, and these records can be generated/stored by the MNO of the telecommunications network. For example, the system can generate and store a shipment record (e.g., in the device identifier database) as part of an order fulfillment process in response to a network subscriber placing an order for the new wireless device. Thus, in some implementations, the system can determine that the wireless device attaching to the network is a new device based on the hardware device identifier appearing in these shipment records.

At 304, the system obtains a geographic location associated with the new device during its attachment to the telecommunications network. The geographic location may be a location estimate generated during the initial attachment of the new device to the radio access network (RAN) of the telecommunications network. In some examples, the geographic location can generally be a cell site area or location associated with a network node to which the new device attached (e.g., a cell ID), or a specific/precise estimate of coordinates within the cell site area (e.g., an enhanced cell ID, a time-of-arrival (TOA) or time-difference-of-arrival (TDOA) estimation, a triangulated estimation).

In some implementations, the geographic location associated with the new device during its attachment can be determined/estimated by the new device itself and reported to the system. For example, the new device can determine or obtain an estimation of its location based on its connection to other networks besides the telecommunications network, such as a Wi-Fi network or Bluetooth connections. Accordingly, the new device can report a locally obtained location estimate to the system, in some examples.

At 306, the system compares the attachment location with one or more known subscriber locations, or locations associated with the network subscriber that is expected/intended to be using the new device. To perform the comparison, the system can obtain the one or more known subscriber locations based at least on subscriber profile information, in some examples.

In particular, according to some implementations, the system first identifies the intended/expected network subscriber for the new device based at least on the hardware device identifier provided by the new device during attachment. The system can refer to shipment records that are configured to associate hardware device identifiers with subscriber identifiers (e.g., a name of the network subscriber, a subscriber ID or account ID used by the MNO, a Mobile Station International Subscriber Directory Number (MSISDN), and/or the like), and thereby identify the intended recipient of the new device during the initial attachment.

In some implementations, the intended/expected network subscriber can be identified by the new device. Prior to being shipped, the new device can be pre-configured to report or transmit an identifier associated with the intended recipient to the system. For example, the new device is an eSIM-configured device, with the eSIM being pre-configured (prior to shipping) with the subscriber identity of the intended recipient, and the new device transmits the pre-configured subscriber identity to the system. The new device can be configured with a temporary or default profile that allows identification of the intended/expected network subscriber.

Once the network subscriber that is expected to be using the new device is identified, the system can determine the one or more known subscriber locations for the comparison. In some implementations, the system can access subscriber profile information stored and used by the MNO of the telecommunications, which can include home addresses, billing addresses, mailing addresses, and/or the like that the system can use as the one or more known subscriber locations. Additionally or alternatively, the known subscriber locations determined by the system can include a delivery address identified in a shipment record for the new device.

Furthermore, the known subscriber locations can include locations associated with the network subscriber's activity and history on the telecommunications network. In some examples, the telecommunications network stores recent and/or frequent locations at which the current or prior wireless devices associated with the network subscriber (e.g., using the subscriber's subscriber identity) have been connected to the telecommunications network. Practically, these recent/frequent locations detected by the telecommunications network can include the subscriber's workplace, school, recreation areas/centers, and/or the like. The known subscriber locations determined via the telecommunications network can further include current locations of the subscriber's current wireless device(s). For instance, the new device may not be misplaced or stolen if it is located adjacent or nearby the subscriber's current wireless device (e.g., the devices may be placed next to one another in order to facilitate a data transfer process).

In some implementations, the system determines these recent/frequent locations from an overall record of subscriber locations detected by the telecommunications network. For example, the system can identify locations that the subscriber has visited at least a threshold number of times over a time period. In some examples, the system can apply a pre-trained model (e.g., a machine learning model) on the set of locations at which the subscriber has connected to the network, and the pre-trained model can predict whether a prior location detected by the telecommunications network is a likely location for the subscriber to be setting up and activating a new device (e.g., based on learned factors such as the frequency of visit, proximity to other known subscriber locations, and/or the like).

Generally, the comparison of the attachment location with the one or more known subscriber locations can suggest whether the new device is in possession of the intended network subscriber, or has been intercepted or delivered to a different party. Thus, if the attachment location matches the one or more known subscriber locations, it may be likely that the new device has been successfully delivered and possessed by the intended network subscriber. Accordingly, at 308, the system can complete a device activation or registration process, in response to a determination that the attachment location matches the one or more known subscriber locations. In some examples, the system can further allow or permit a data transfer process from the subscriber's old device to the new device, enabling the user to complete or continue the setup process for the new device.

Some implementations can, alternatively or additionally, consider whether a subscriber identity provided by the new wireless device matches the subscriber identity associated with the intended recipient of the device. In some instances, a malicious actor who comes into possession of the new wireless device may attempt to insert their own SIM or configure the new wireless device with their own SIM profile. Accordingly, the system can perform a check of the subscriber identity provided by wireless device to supplement or substitute the location check.

On the other hand, if the attachment location does not match the one or more known subscriber locations, it is possible that the user of the new device is not the intended network subscriber (whether by malicious effort or mistake). Accordingly, at 310, the system can execute or perform one or more security actions, in response to a determination that the attachment location failing to match the one or more known subscriber locations.

The security action can include the system causing a security alert to be provided at a current wireless device associated with the network subscriber. The telecommunications network can be aware of currently or recently connected wireless devices associated with the network subscriber, and the security alert can be transmitted, via the telecommunications network for example, to these devices. The security alert can include the attachment location of the new device and query the user at the current device(s) (e.g., the network subscriber) whether it is indeed the network subscriber that is setting up the new device. Thus, the security alert enables the network subscriber to confirm possession and use of the new device (despite the location discrepancy) or to report the new device as stolen or mis-delivered. In some examples, the security alert may be a text message, a voice call or message, and/or the like sent to the subscriber's current device, and the user of the subscriber's current device can respond to the security alert via the same medium. In other examples, the security alert is a pop-up, alert, notification, user interface of a user application (e.g., a user application associated with the MNO) having interface features configured within to allow the user to respond. In some implementations, the system can first determine whether the current wireless device is located at one of the known locations associated with the subscriber, and provide the security alert if the current wireless device is located at a known subscriber location.

In the case that the user at the subscriber's current device indicates that the new device is not being used by the intended network subscriber, additional or further security actions may be performed. For example, the new device can be blacklisted or locked. To blacklist the new device, the system can add the hardware device identifier (e.g., IMEI) reported to the network by the new device to the device identifier database as a blacklisted identifier. In some examples, the new device can be quarantined on the network, or prevented from accessing or using any information specific to the intended network subscriber. The system can additionally trigger various order fulfillment processes, such as a refund for the new device, a shipment of a second new device, connecting the intended network subscriber to a messaging session or voice call session with a customer care team, and/or the like.

Accordingly, example implementations of these operations can enable detection of device delivery failures, and possible fraud or malicious activity when setting up and activating new wireless devices on a telecommunications network. By leveraging network-based location estimates and subscriber location information uniquely known to the network, the accuracy of the security determinations can also be improved. Furthermore, performance of at least these operations in response to an initial attachment of a new wireless device to the telecommunications network enables an early detection and response of device theft or delivery mistakes.

Example Computing Systems

Figure 4:
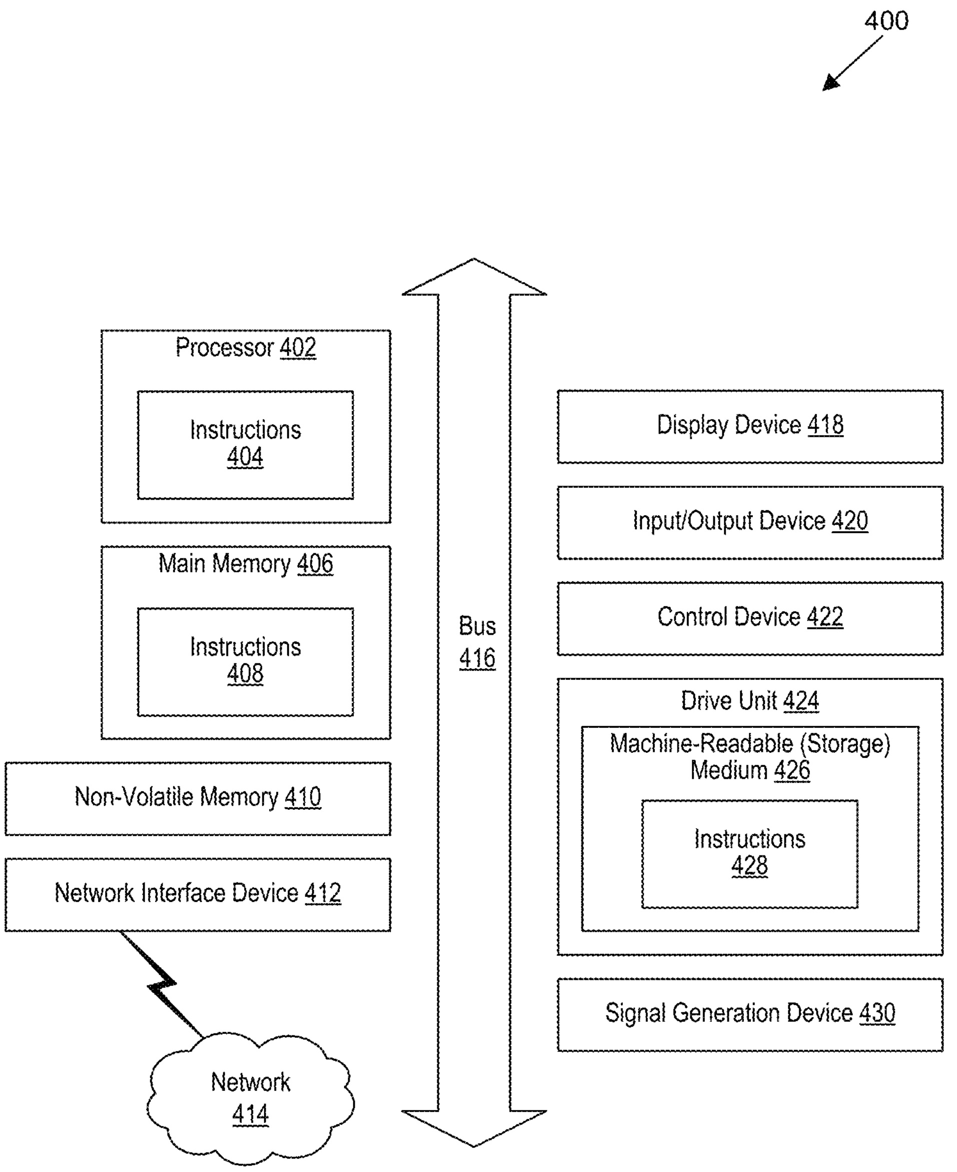
FIG. 4 is a block diagram that illustrates an example of a computing system in which at least some operations described herein can be implemented.

FIG. 4 is a block diagram that illustrates an example of a computing system 400 in which at least some operations described herein can be implemented. As shown, the computing system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

In some implementations, the signal generation unit 424 and/or the network interface device 412 comprises one or more antennae for wirelessly transmitting and receiving signals with other systems. The antennae of the signal generation unit 424 and/or the network interface device 412 may be coupled to a battery unit of the computing system 400, which supplies power for electrically exciting the antennae. The signal generation unit 424 and/or the network interface device 412 may be configured to operate the antennae according to one of a plurality of power classes, based on which a transmit power of the antennae is controlled/limited.

The computing system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computing system 400 can be an embedded computing system, a system-on-chip (SOC), a single-board computing system (SBC), or a distributed system such as a mesh of computing systems, or it can include one or more cloud components in one or more networks. Where appropriate, one or more computing systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A system implemented by a telecommunications network for enhancing security of new wireless device setup, comprising:

at least one hardware processor; and at least one memory storing instructions that, when executed by the at least one hardware processor, cause the system to perform operations comprising:

determining that a new wireless device has attached to the telecommunications network based on a comparison of a hardware device identifier provided by the new wireless device against known device identifiers stored in a database, wherein the new wireless device is expected to be delivered to a network subscriber of the telecommunications network;

in connection with a network registration process for the new wireless device, obtaining a geographic location associated with the new wireless device at a time that the new wireless device attached to the telecommunications network;

comparing the geographic location to a home location associated with the network subscriber to which the new wireless device is expected to be delivered, the home location being indicated in a subscriber profile record associated with the network subscriber; and in response to a determination that the home location does not match the geographic location, causing a security alert to be provided at a current wireless device associated with the network subscriber, wherein the current wireless device is connected to the telecommunications network and identified via a subscriber identity associated with the network subscriber.

2. The system of claim 1, wherein the operations further comprise:

in response to receiving a particular security response from the current wireless device, adding the hardware device identifier provided by the new wireless device to a blacklist.

3. The system of claim 1, wherein the operations further comprise, prior to the new wireless device attaching to the telecommunications network, storing a record of the new wireless device being sent to the home location associated with the network subscriber, and wherein the network subscriber to which the new wireless device is expected to be delivered is identified via the record using the hardware device identifier provided by the new wireless device.

4. The system of claim 1, wherein the geographic location is a cell site area associated with a network node to which the new wireless device has attached.

5. The system of claim 1, wherein the operations further comprise comparing the geographic location associated with the new wireless device attaching to the telecommunications network to a current location of the current wireless device associated with the network subscriber, and wherein the security alert is transmitted further in response to the determination that the geographic location and the current location do not match.

6. The system of claim 1, wherein the new wireless device is an eSIM-configured device.

7. The system of claim 1, wherein the security alert being provided at the current wireless device is configured to enable a particular security response indicating that the new wireless device is in possession of an intended recipient and enabling the network registration process for the new wireless device to continue.

8. A method for enhancing security with a telecommunications network, comprising:

determining, by at least one processor, that a new wireless device has attached to a radio access network (RAN) component of the telecommunications network based on a comparison of a hardware device identifier provided by the new wireless device against known device identifiers stored in a database, wherein the new wireless device is expected to be delivered to a network subscriber of the telecommunications network;

obtaining, by the at least one processor from the radio access network (RAN) component of the telecommunications network, a geographic location associated with the new wireless device at a time that the new wireless device attached to the RAN component of the telecommunications network;

comparing the geographic location to an expected delivery location for the new wireless device; and in response to a determination that the geographic location does not correspond to the expected delivery location, causing a security alert to be provided at one or more current wireless devices associated with the network subscriber and having been connected to the telecommunications network.

9. The method of claim 8, wherein the expected delivery location is a home location that is indicated within a subscriber profile record associated with the network subscriber.

10. The method of claim 8, further comprising:

in response to receiving a particular security response to the security alert, adding the hardware device identifier provided by the new wireless device to a blacklist.

11. The method of claim 8, further comprising:

identifying the network subscriber to which the new wireless device is expected to be delivered based on referencing the hardware device identifier provided by the new wireless device against a set of delivery records generated by a network operator for the telecommunications network.

12. The method of claim 8, wherein the geographic location is obtained based on a cell site location associated with a network node to which the new wireless device has attached.

13. The method of claim 8, wherein the new wireless device is an eSIM-configured device.

14. The method of claim 8, wherein the security alert being provided at the one or more current wireless devices is configured to enable a particular security response indicating that the new wireless device is in possession of the network subscriber and enabling a network registration process for the new wireless device to continue.

15. At least one non-transitory computer-readable medium storing instructions that, when executed by at least one processor, cause the at least one processor to perform operations comprising:

determining that a new wireless device has attached to a telecommunications network based on a comparison of a hardware device identifier provided by the new wireless device against known device identifiers stored in a database, wherein the new wireless device is expected to be delivered to a network subscriber of the telecommunications network;

obtaining a geographic location associated with the new wireless device at a time that the new wireless device attached to the telecommunications network;

comparing the geographic location to an expected delivery location for the new wireless device; and in response to a determination that the geographic location does not correspond to the expected delivery location, causing a security alert to be provided at one or more current wireless devices associated with the network subscriber and having been connected to the telecommunications network.

16. The at least one non-transitory computer-readable medium of claim 15, wherein the expected delivery location is a home location that is indicated within a subscriber profile record associated with the network subscriber.

17. The at least one non-transitory computer-readable medium of claim 15, wherein the operations further comprise:

in response to receiving a particular security response to the security alert, adding the hardware device identifier provided by the new wireless device to a blacklist.

18. The at least one non-transitory computer-readable medium of claim 15, wherein the operations further comprise:

identifying the network subscriber to which the new wireless device is expected to be delivered based on referencing the hardware device identifier provided by the new wireless device against a set of delivery records generated by a network operator for the telecommunications network.

19. The at least one non-transitory computer-readable medium of claim 15, wherein the geographic location is obtained based on a cell site location associated with a network node to which the new wireless device has attached.

20. The at least one non-transitory computer-readable medium of claim 15, wherein the security alert being provided at the one or more current wireless devices is configured to enable a particular security response indicating that the new wireless device is in possession of the network subscriber and enabling a network registration process for the new wireless device to continue.

* * * * *